US 009442772 B2

(12) United States Patent
Abdallah

(10) Patent No.: US 9,442,772 B2
(45) Date of Patent: Sep. 13, 2016

(54) GLOBAL AND LOCAL INTERCONNECT STRUCTURE COMPRISING ROUTING MATRIX TO SUPPORT THE EXECUTION OF INSTRUCTION SEQUENCES BY A PLURALITY OF ENGINES

(75) Inventor: Mohammad Abdallah, San Jose, CA (US)

(73) Assignee: SOFT MACHINES INC., Santa Clara, CA (US)

( * ) Notice: Subject to any disclaimer, the term of this patent is extended or adjusted under 35 U.S.C. 154(b) by 434 days.

(21) Appl. No.: 13/475,739

(22) Filed: May 18, 2012

(65) Prior Publication Data
US 2012/0297396 A1 Nov. 22, 2012

Related U.S. Application Data

(60) Provisional application No. 61/488,683, filed on May 20, 2011.

(51) Int. Cl.
G06F 9/50 (2006.01)
G06F 15/80 (2006.01)
G06F 9/38 (2006.01)
G06F 9/30 (2006.01)
G06F 9/52 (2006.01)
G06F 9/48 (2006.01)
G06F 9/46 (2006.01)

(52) U.S. Cl.
CPC ........... *G06F 9/5077* (2013.01); *G06F 9/3012* (2013.01); *G06F 9/3824* (2013.01); *G06F 9/3836* (2013.01); *G06F 9/3851* (2013.01); *G06F 9/3891* (2013.01); *G06F 15/80* (2013.01); *G06F 9/46* (2013.01); *G06F 9/4881* (2013.01); *G06F 9/52* (2013.01)

(58) Field of Classification Search
CPC ....... G06F 9/5077; G06F 9/52; G06F 9/4881
USPC ...................... 718/103, 104; 365/201, 41, 38
See application file for complete search history.

(56) References Cited

U.S. PATENT DOCUMENTS 5,197,130 A   3/1993   Chen et al.
5,901,294 A   5/1999   Tran et al.
(Continued)

FOREIGN PATENT DOCUMENTS

CN          1214666 C   *  8/2005   ............. G06F 9/505
CN          1848095 A   * 10/2006   ............ G06F 12/084
WO       WO2008061154       5/2008

OTHER PUBLICATIONS

Alimohammad et al, Modeling of FPGA Local/Global Interconnect Resources and Derivation of Minimal Test Configuration, 2002, IEEE, Proceedings of the 17th IEEE international Symposium on Defect and Fault Tolerance in VLSI Systems, DFT'02, pp. 1-9.*

*Primary Examiner* — Abu Ghaffari

(57) ABSTRACT

A global interconnect system. The global interconnect system includes a plurality of resources having data for supporting the execution of multiple code sequences and a plurality of engines for implementing the execution of the multiple code sequences. A plurality of resource consumers are within each of the plurality of engines. A global interconnect structure is coupled to the plurality of resource consumers and coupled to the plurality of resources to enable data access and execution of the multiple code sequences, wherein the resource consumers access the resources through a per cycle utilization of the global interconnect structure.

22 Claims, 15 Drawing Sheets

(56) References Cited

U.S. PATENT DOCUMENTS

| | | | |
|---|---|---|---|
| 6,282,583 B1 | 8/2001 | Pincus et al. | |
| 6,282,638 B1* | 8/2001 | Dowling | 712/228 |
| 6,408,367 B2* | 6/2002 | Achilles et al. | 711/157 |
| 6,829,698 B2* | 12/2004 | Arimilli et al. | 712/208 |
| 7,047,322 B1 | 5/2006 | Bauman et al. | |
| 7,139,855 B2* | 11/2006 | Armstrong | G06F 9/526 |
| | | | 710/200 |
| 7,150,021 B1 | 12/2006 | Vajjhala et al. | |
| 7,213,248 B2* | 5/2007 | Arimilli et al. | 718/104 |
| 7,577,820 B1* | 8/2009 | Wentzlaff | G06F 15/16 |
| | | | 712/10 |
| 7,647,483 B2* | 1/2010 | Bates | G06F 9/463 |
| | | | 712/220 |
| 7,925,869 B2* | 4/2011 | Kelsey et al. | 712/220 |
| 8,108,545 B2* | 1/2012 | Arimilli | H04L 67/10 |
| | | | 370/458 |
| 8,145,880 B1* | 3/2012 | Cismas | G06F 15/17381 |
| | | | 712/11 |
| 2002/0126657 A1* | 9/2002 | Frouin | H04L 12/1886 |
| | | | 370/352 |
| 2003/0035422 A1 | 2/2003 | Hill | |
| 2003/0131335 A1* | 7/2003 | Hamlin | 716/16 |
| 2003/0169626 A1 | 9/2003 | Burk et al. | |
| 2003/0200412 A1 | 10/2003 | Peinado et al. | |
| 2003/0202530 A1 | 10/2003 | Jenkins et al. | |
| 2003/0225938 A1* | 12/2003 | Glasco | G06F 15/17381 |
| | | | 713/375 |
| 2005/0044547 A1 | 2/2005 | Gipp | |
| 2005/0055504 A1* | 3/2005 | Hass | G06F 12/0813 |
| | | | 711/122 |
| 2005/0108715 A1* | 5/2005 | Kanai | G06F 9/4881 |
| | | | 718/100 |
| 2005/0132145 A1 | 6/2005 | Dybsetter et al. | |
| 2005/0204118 A1 | 9/2005 | Jen et al. | |
| 2006/0143390 A1 | 6/2006 | Kottapalli | |
| 2007/0262270 A1 | 11/2007 | Huang et al. | |
| 2008/0040724 A1* | 2/2008 | Kang | G06F 9/3851 |
| | | | 718/104 |
| 2008/0046666 A1* | 2/2008 | Termaine | 711/154 |
| 2008/0052432 A1* | 2/2008 | Wilson | G06F 3/0611 |
| | | | 710/104 |
| 2008/0109611 A1 | 5/2008 | Liu et al. | |
| 2008/0126643 A1 | 5/2008 | Higuchi | |
| 2008/0184211 A1 | 7/2008 | Nickolls | |
| 2008/0256278 A1 | 10/2008 | Thomas et al. | |
| 2008/0256330 A1* | 10/2008 | Wang et al. | 712/24 |
| 2009/0113170 A1 | 4/2009 | Abdallah | |
| 2009/0119457 A1* | 5/2009 | Latorre | G06F 9/3851 |
| | | | 711/125 |
| 2010/0082912 A1 | 4/2010 | Lesartre et al. | |
| 2010/0088443 A1 | 4/2010 | Riocreux et al. | |
| 2010/0100704 A1* | 4/2010 | Hill | G06F 17/5054 |
| | | | 712/19 |
| 2010/0115167 A1 | 5/2010 | Tardieux et al. | |
| 2012/0096204 A1 | 4/2012 | Auerbach et al. | |

* cited by examiner

| | Segment 1 | Segment 2 | Segment 3 |
|---|---|---|---|
| Request 1 | 1 | 1 | 0 |
| Request 2 | 0 | 0 | 1 |
| Request 3 | 0 | 1 | 0 |
| Request 4 | 0 | 1 | 1 |
| Request 5 | 1 | 1 | 0 |
| Request 6 (cancelled) | 1 | 1 (exceed limit) | 0 |
| Request 7 (cancelled) | 1 | 1 (exceed limit) | 1 |
| Request 8 | 0 | 0 | 1 |

FIG. 7

| | 1-3 | 3-1 | 4-1 | 1-4 | 2-4 | 4-2 |
|---|---|---|---|---|---|---|
| Request 1 | 0 | 1 | 0 | 0 | 0 | 0 |
| Request 2 | 0 | 0 | 1 | 0 | 0 | 1 |
| Request 3 | 0 | 0 | 0 | 0 | 1 | 0 |
| Request 4 (cancelled) | 1 | 0 | 0 | 0 | 1 (exceed limit) | 0 |
| Request 5 | 0 | 0 | 0 | 1 | 0 | 0 |
| Request 6 (cancelled) | 0 | 1 (exceed limit) | 0 | 0 | 0 | 0 |
| Request 7 (cancelled) | 1 (exceed limit) | 1 (exceed limit) | 0 | 0 | 0 | 0 |
| Request 8 | 0 | 0 | 0 | 0 | 0 | 0 |

Only one pair uses of the bus, point to point

Requests come from multiple orchestrators that want to route through the point to point busses

FIG. 8

GLOBAL AND LOCAL INTERCONNECT STRUCTURE COMPRISING ROUTING MATRIX TO SUPPORT THE EXECUTION OF INSTRUCTION SEQUENCES BY A PLURALITY OF ENGINES

This application claims the benefit commonly assigned U.S. Provisional Patent Application Ser. No. 61/488,683, titled "AN INTERCONNECT STRUCTURE TO SUPPORT THE EXECUTION OF INSTRUCTION SEQUENCES BY A PLURALITY OF ENGINES" by Mohammad A. Abdallah, filed on May 20, 2011, and which is incorporated herein in its entirety.

CROSS REFERENCE TO RELATED APPLICATION

This application is related to co-pending commonly assigned U.S. patent application Ser. No. 12/514,303, titled "APPARATUS AND METHOD FOR PROCESSING COMPLEX INSTRUCTION FORMATS IN A MULTITHREADED ARCHITECTURE SUPPORTING VARIOUS CONTEXT SWITCH MODES AND VIRTUALIZATION SCHEMES" by Mohammad A. Abdallah, filed on Jan. 5, 2010, and which is incorporated herein in its entirety.

This application is related to co-pending commonly assigned U.S. patent application Ser. No. 12/296,919, titled "APPARATUS AND METHOD FOR PROCESSING AN INSTRUCTION MATRIX SPECIFYING PARALLEL IN DEPENDENT OPERATIONS" by Mohammad A. Abdallah, filed on Dec. 19, 2008, and which is incorporated herein in its entirety.

FIELD OF THE INVENTION

The present invention is generally related to digital computer systems, more particularly, to a system and method for selecting instructions comprising an instruction sequence.

BACKGROUND OF THE INVENTION

Processors are required to handle multiple tasks that are either dependent or totally independent. The internal state of such processors usually consists of registers that might hold different values at each particular instant of program execution. At each instant of program execution, the internal state image is called the architecture state of the processor.

When code execution is switched to run another function (e.g., another thread, process or program), then the state of the machine/processor has to be saved so that the new function can utilize the internal registers to build its new state. Once the new function is terminated then its state can be discarded and the state of the previous context will be restored and execution resumes. Such a switch process is called a context switch and usually includes 10's or hundreds of cycles especially with modern architectures that employ large number of registers (e.g., 64, 128, 256) and/or out of order execution.

In thread-aware hardware architectures, it is normal for the hardware to support multiple context states for a limited number of hardware-supported threads. In this case, the hardware duplicates all architecture state elements for each supported thread. This eliminates the need for context switch when executing a new thread. However, this still has multiple draw backs, namely the area, power and complexity of duplicating all architecture state elements (i.e., registers) for each additional thread supported in hardware. In addition, if the number of software threads exceeds the number of explicitly supported hardware threads, then the context switch must still be performed.

This becomes common as parallelism is needed on a fine granularity basis requiring a large number of threads. The hardware thread-aware architectures with duplicate context-state hardware storage do not help non-threaded software code and only reduces the number of context switches for software that is threaded. However, those threads are usually constructed for coarse grain parallelism, and result in heavy software overhead for initiating and synchronizing, leaving fine grain parallelism, such as function calls and loops parallel execution, without efficient threading initiations/auto generation. Such described overheads are accompanied with the difficulty of auto parallelization of such codes using sate of the art compiler or user parallelization techniques for non-explicitly/easily parallelized/threaded software codes.

SUMMARY OF THE INVENTION

In one embodiment the present invention is implemented as a global interconnect system. The global interconnect system includes a plurality of resources having data for supporting the execution of multiple code sequences and a plurality of engines for implementing the execution of the multiple code sequences. A plurality of resource consumers are within each of the plurality of engines. A global interconnect structure is coupled to the plurality of resource consumers and coupled to the plurality of resources to enable data access and execution of the multiple code sequences, wherein the resource consumers access the resources through a per cycle utilization of the global interconnect structure.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

FIG. 7 shows a table that illustrates the manner which requests for segments of the interconnect are contested for and allocated in accordance with one embodiment of the present invention.

FIG. 8 shows a table that illustrates the manner in which requests for a point-to-point bus are handled in accordance with one embodiment of the present invention.

DETAILED DESCRIPTION OF THE INVENTION

Figure 1A:
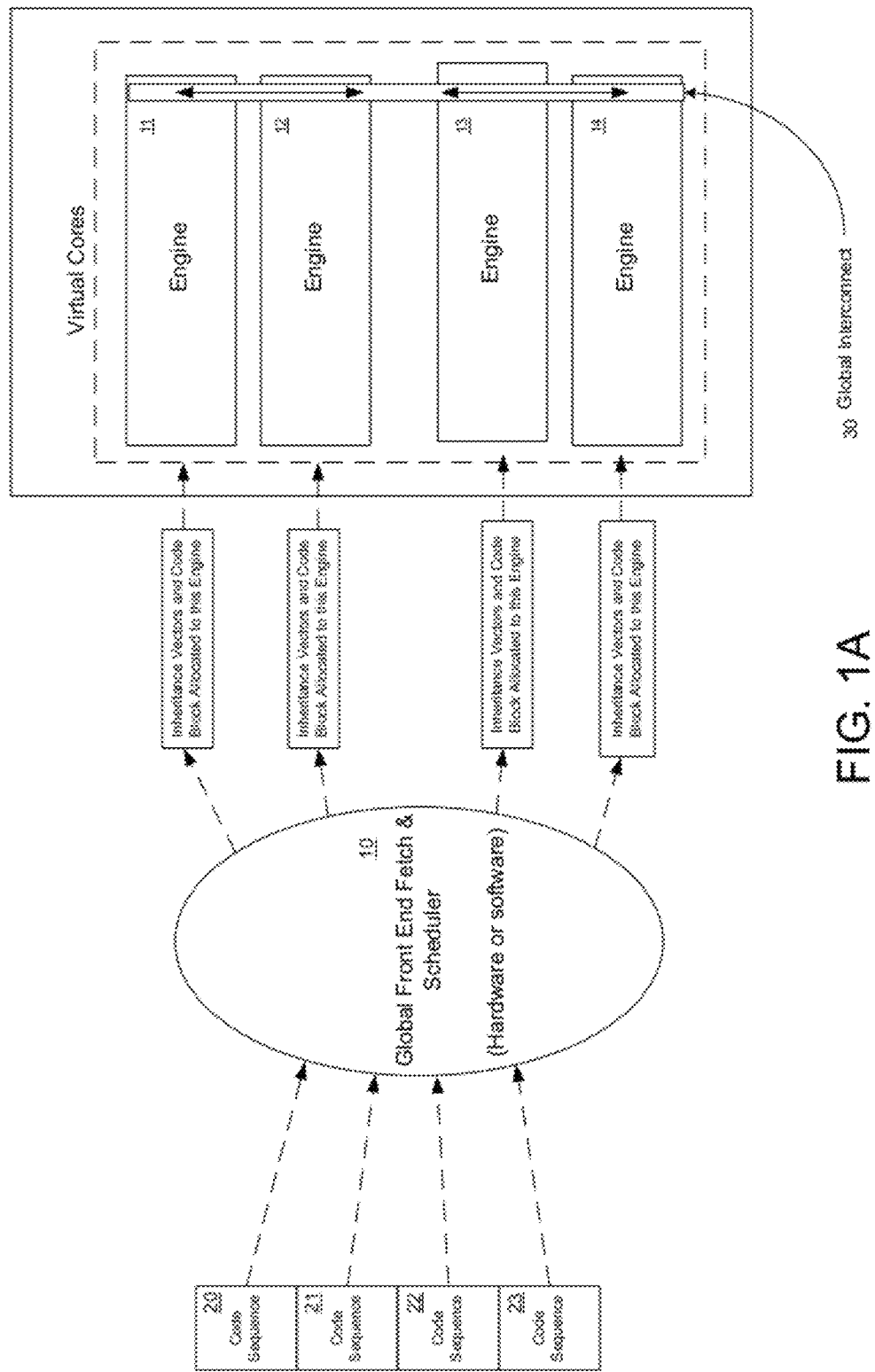
FIG. 1A shows an overview of the manner in which the global front end generates code blocks and inheritance vectors to support the execution of code sequences on their respective engines.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Embodiments of the present invention utilize a front end scheduler, a plurality of segmented register files or a single register file, and a memory subsystem to implement fragmented address spaces for multiple cores of a multicore processor. In one embodiment, fragmentation enables the scaling of microprocessor performance by allowing additional virtual cores (e.g., soft cores) to cooperatively execute instruction sequences comprising one or more threads. The fragmentation hierarchy is the same across each cache hierarchy (e.g., L1 cache, L2 cache). The fragmentation hierarchy divides the address space into fragments using address bits, where the address bits are used such that the fragments are identified by bits that are above cache line boundaries and below page boundaries. Each fragment is configured to utilize a multiport bank structure for storage. Embodiments of the present invention are further described in the FIGS. 1A and 1B below.

FIG. 1A shows an overview diagram of a processor in accordance with one embodiment of the present invention. As depicted in FIG. 1A, the processor includes a global front end fetch and scheduler 10 and a plurality of partitionable engines 11-14.

FIG. 1A shows an overview of the manner in which the global front end generates code blocks and inheritance vectors to support the execution of code sequences on their respective partitionable engines. Each of the code sequences 20-23 can belong to the same logical core/thread or to different logical cores/threads, depending upon the particular virtual core execution mode. The global front end fetch and scheduler will process the code sequences 20-23 to generate code blocks and inheritance vectors. These code blocks and inheritance vectors are allocated to the particular partitionable engines 11-14 as shown.

The engines implement virtual cores, in accordance with a selected mode. An engine includes a segment, a fragment and a number of execution units. The resources within the engines can be used to implement virtual cores that have multiple modes. As provisioned by the virtual core mode, one soft core, or many soft cores, can be implemented to support one logical core/thread. In the FIG. 1A embodiment, depending on the selected mode, the virtual cores can support one logical core/thread or four logical cores/threads. In an embodiment where the virtual cores support four logical cores/threads, the resources of each virtual core are spread across each of the partitionable engines. In an embodiment where the virtual cores support one logical core/thread, the resources of all the engines are dedicated to that core/thread. The engines are partitioned such that each engine provides a subset of the resources that comprise each virtual core. In other words, a virtual core will comprise a subset of the resources of each of the engines 11-14. Communication between the resources of each of the engines 11-14 is provided by a global interconnection structure 30 in order to facilitate this process. Alternatively, the engines 11-14 can be used to implement a physical mode where the resources of the engines 11-14 are dedicated to support the execution of a dedicated core/thread. In this manner, the soft cores implemented by the engines comprise virtual cores that have resources spread across each of the engines. The virtual core execution modes are further described in the figures below.

It should be noted that in a conventional core implementation, the resources within one core/engine are solely allocated to one logical thread/core. In contrast, in embodiments of the present invention, the resources of any engine/core can be partitioned, collectively with other engine/core partitions, to instantiate a virtual core that is allocated to one logical thread/core. Embodiments of the present invention can also implement multiple virtual execution modes in which those same engines can be partitioned to support many dedicated cores/threads or many dynamically allocated cores/threads, as well as configurations in which -where all of the resources of all engines support the execution of a single core/thread. Some representative embodiments are further described below. In other embodiments of the current invention, the techniques of the current invention can be applied directly to a conventional multi-core implementation to enable efficient contestation, reservation and allocation of multi-core shared resources and interconnects. Similarly the current invention can be applied within a single core or compute engine to enable efficient contestation, reservation and allocation of any shared resources or interconnects within the core (i.e., ports, busses, execution units, caches, structures), For example, the embodiments shown in FIG. 1A, FIG. 1B and FIG. 5 could be replaced by a typical multi-core design that has no global front-end or inheritance vectors, but rather has engines that instantiate multiple cores or multiple threads having access to resources such as caches, shared interconnects (e.g., meshes or grids), or shared multi-directional busses. In such embodiments, the current invention can still be directly applied to allow efficient resource and interconnect contestation, reservation and allocation. Similarly, embodiments of the current invention can be applied to each core or engine in order to contend, reserve and allocate resources or interconnects.

Figure 1B:
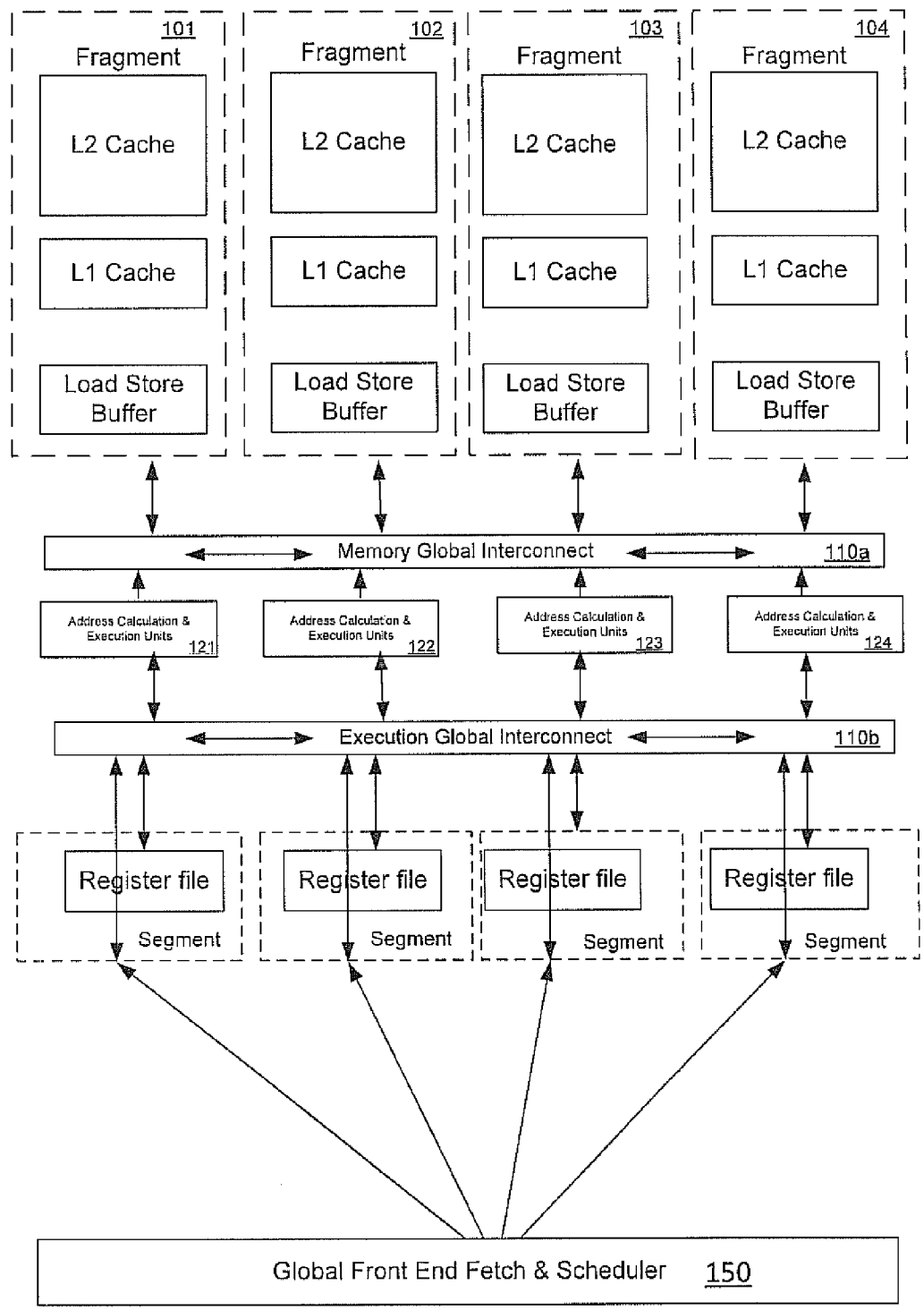
FIG. 1B shows an overview diagram of engines and their components, including segmented scheduler and register files, interconnects and a fragmented memory subsystem for a multicore processor in accordance with one embodiment of the present invention.

FIG. 1B shows an overview diagram of partitionable engines and their components, including segmented scheduler and register files, global interconnects and a fragmented memory subsystem for a multicore processor in accordance with one embodiment of the present invention. As depicted in FIG. 1, four fragments 101-104 are shown. The fragmentation hierarchy is the same across each cache hierarchy (e.g., L1 cache, L2 cache, and the load store buffer). Data can be exchanged between each of the L1 caches, each of the L2 caches and each of the load store buffers through the memory global interconnect 110a.

The memory global interconnect comprises a routing matrix that allows a plurality of cores (e.g., the address calculation and execution units 121-124) to access data that may be stored at any point in the fragmented cache hierarchy (e.g., L1 cache, load store buffer and L2 cache). FIG. 1 also depicts the manner whereby each of the fragments 101-104 can be accessed by address calculation and execution units 121-124 through the memory global interconnect 110a.

The execution global interconnect 110b similarly comprises a routing matrix allows the plurality of cores (e.g., the address calculation and execution units 121-124) to access data that may be stored at any of the segmented register files. Thus, the cores have access to data stored in any of the fragments and 2 data stored in any of the segments through the memory global interconnect 110a or the execution global interconnect 110b.

FIG. 1B further shows a global front end fetch & scheduler 150 which has a view of the entire machine and which manages the utilization of the register files segments and the fragmented memory subsystem. Address generation comprises the basis for fragment definition. The global front end Fetch & scheduler functions by allocating instruction sequences to each segment's partition scheduler. The common partition scheduler then dispatches those instruction sequences for execution on the address calculation and execution units 121-124.

Additionally, it should be noted that the partitionable engines shown in FIG. 1A can be nested in a hierarchal way. In such an embodiment, a first level partitionable engine would include a local front end fetch and scheduler and multiple secondary partitionable engines connected to it.

Figure 2:
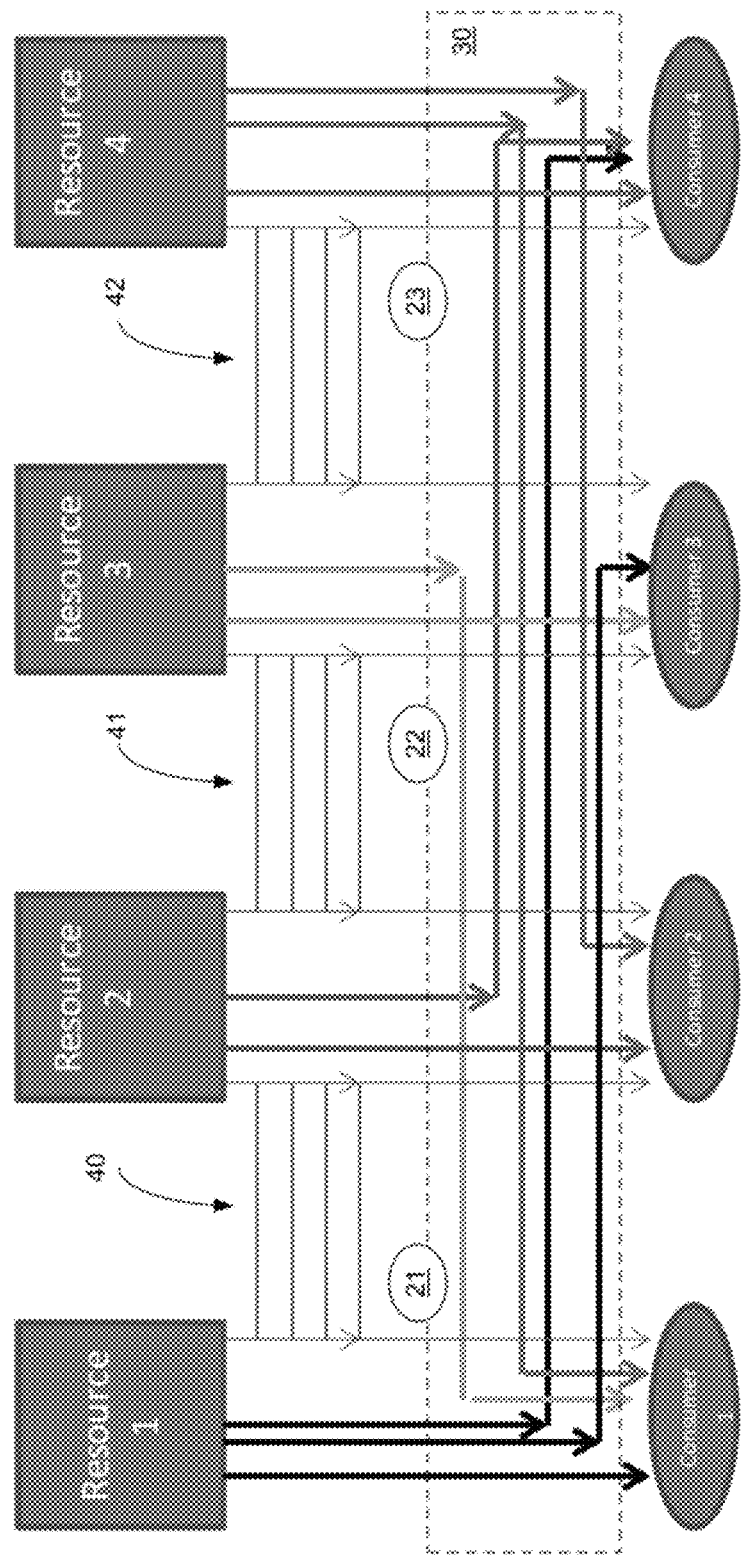
FIG. 2 shows an overview diagram depicting additional features of the interconnect described in the discussion of FIGS. 1A and 1B, and a plurality of local interconnects in accordance with one embodiment of the present invention.

FIG. 2 shows an overview diagram depicting additional features of the interconnect 30 described above in the discussion of FIGS. 1A and 1B, and a plurality of local interconnects 40-42 in accordance with one embodiment of the present invention. The FIG. 2 structure illustrates an orchestrating model of an interconnect structure. FIG. 2 shows a plurality of resources connected to a corresponding plurality of consumers. The resources are the data storage resources of each of the partitionable engines (e.g., register files, load store buffers, L1 cache and L2 cache). The consumers are the execution units and address calculation units of each of the partitionable engines. FIG. 2 further shows a plurality of orchestrators 21-23.

As described above, communication between the resources of each of the engines 11-14 is provided by an interconnection structure. By way of example, in the FIG. 2 embodiment, the interconnect structure 30 is a dedicated point-to-point bus. In the FIG. 2 embodiment, there are six buses which span across the resources of each of the engines. Only one consumer/resource pair can utilize one of the six busses per cycle. The consumer/resource pairs contend with each other for use of the six busses through an OR-AND and a threshold detection logic of FIG. 10, However the same orchestration for a shared multi-point busses configuration can be achieved using the reservation adder and threshold limit or process, as further described in the discussion of FIG. 9.

The orchestrators 21-23 comprise controlled entities that direct the routing of a resource to a consumer. For example, in one embodiment, an orchestrator can be a thread scheduler that schedules a resource for transfer through the interconnect to a consumer that is ready for execution. The orchestrator (e.g., thread scheduler) identifies the correct resource, reserves the necessary bus, and causes the transfer of that resource to a selected consumer. In this manner, the orchestrator monitors the readiness of instructions and selects the execution units that will be used to execute the instructions. This information is used to orchestrate the transfer of the resource across the interconnect to the selected execution units (e.g., selected consumer) by contending the requests at the interconnect using the reservation and allocation logic as illustrated by either of FIG. 9 or FIG. 10. In this manner, the execution units of the consumers themselves are treated as resources that need to be contended for by the orchestrators using similar resource reservation and allocation methods as illustrated for the interconnect. Where in the execution units are reserved and allocated by contending the requests that come from all orchestrators using either of the reservation and allocation logic of FIG. 9 or FIG. 10.

The interconnect comprises a routing matrix that allows a plurality of resource consumers, in this case, a plurality of cores (e.g., the address calculation and execution units 121-124), to access a resource, in this case data, that may be stored at any point in the fragmented cache hierarchy (e.g., L1 cache, load store buffer and L2 cache). The cores can similarly access data that may be stored at any of the segmented register files. Thus, the cores have access to data stored in any of the fragments and to data stored in any of the segments through the interconnect structure 30. In one embodiment, the interconnect structure comprises two structures, the memory interconnect 110$a$ and the execution interconnect 110$b$, as shown and described above in the discussion of FIG. 1B.

FIG. 2 also shows the plurality of local interconnects 40-42. The local interconnects 40-42 comprise a routing matrix that allows resource consumers from adjacent partitionable engines to quickly access resources of immediately adjacent partitionable engines. For example, one core can use a local interconnect 40 to quickly access resources of the adjacent partitionable engine (e.g., register file, load store buffer, etc.).

Thus, the interconnect structure itself comprises a resource that must be shared by each of the cores of each of the partitionable engines. The interconnect structure 30 and the local interconnect structures 40-42 implement an interconnect structure that allows cores from any of the partitionable engines to access resources of any other of the partitionable engines. This interconnect structure comprises transmission lines that span all of the partitionable engines of the integrated circuit device, in the case of the interconnect structure, and span between engines of the integrated circuit device, in the case of the local interconnect structure.

Embodiments of the present invention implement a non-centralized access process for using the interconnects and the local interconnects. The finite number of global buses and local buses comprise resources which must be efficiently shared by the orchestrators. Additionally, a non-centralized access process is used by the orchestrators to efficiently share the finite number of ports that provide read/write access to the resources of each of the partitionable engines.

In one embodiment, the non-centralized access process is implemented by the orchestrators reserving a bus (e.g., a local interconnect bus or an interconnect bus) and a port into the desired resource. For example, orchestrator 21 needs to reserve an interconnect and a port in order for consumer 1 to access resource 3, while orchestrator 22 to needs to reserve an interconnect and the port in order for consumer for to access resource 2.

Figure 3:
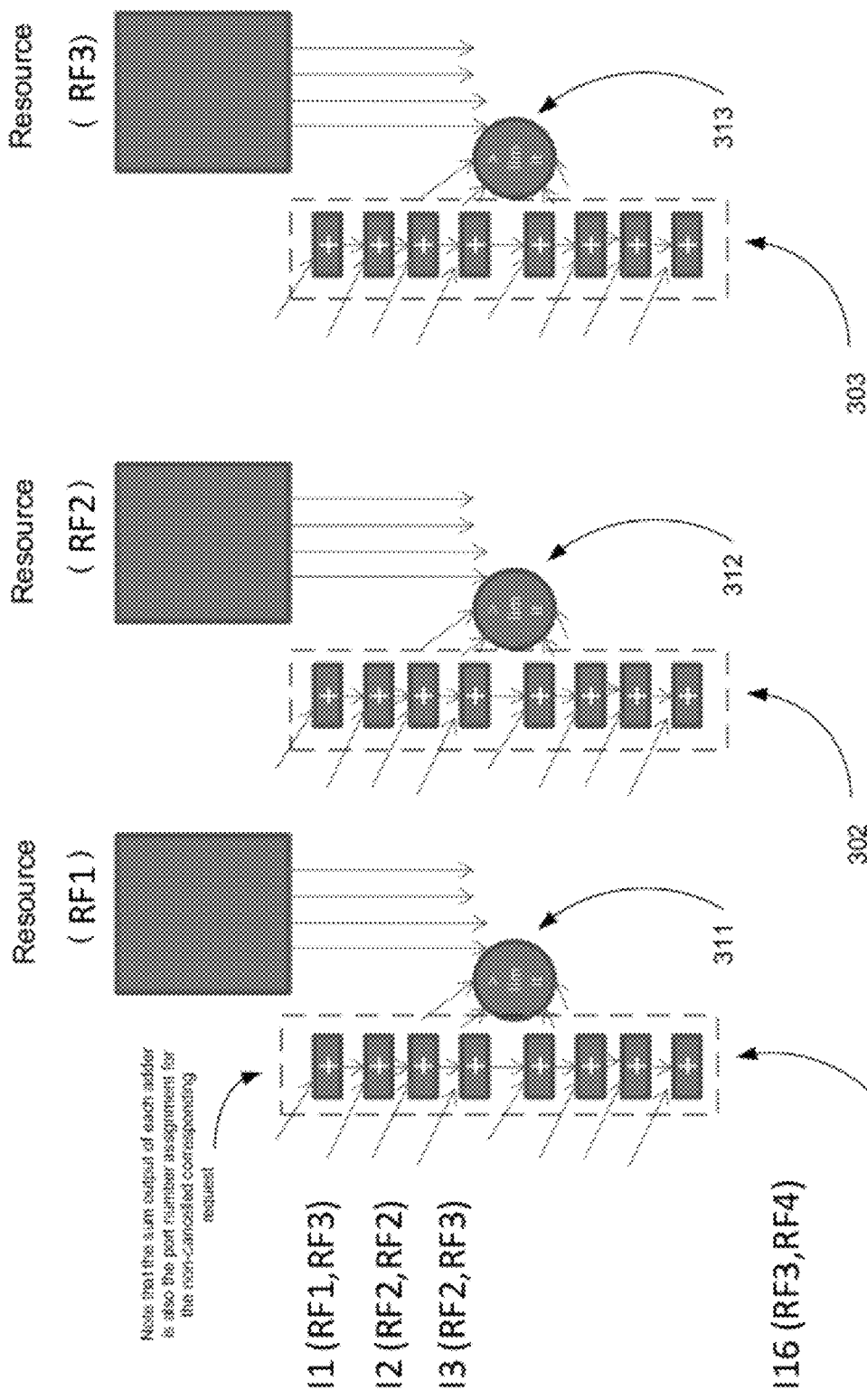
FIG. 3 shows components comprising a resource reservation mechanism that implements efficient access to a contested resource in accordance with one embodiment of the present invention.

FIG. 3 shows components comprising a resource reservation mechanism that implements efficient access to a contested resource in accordance with one embodiment of the present invention. As shown in FIG. 3, three reservation adders 301-303 are shown coupled to threshold limiters 311-313, which control access to each of the four ports for each of the three resources. Each adder output sum (if not canceled) also serves as the port selector for each of the accesses, such that each request that succeeds can use the port number indicated by the sum at the output of that request adder. It should be noted that as indicated in the FIG. 3 diagram, the sum of each depicted adder is also the assigned port number for the non-cancelled corresponding request.

Figure 9:
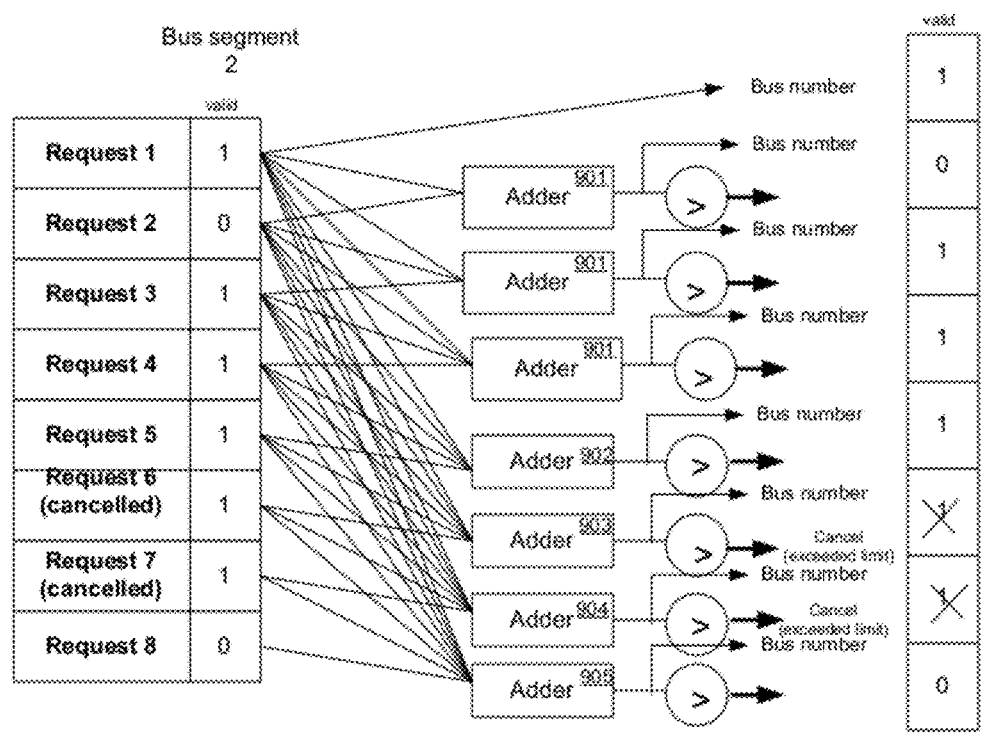
FIG. 9 shows a diagram of an exemplary logic implementation that implements the functionality of the table of FIG. 7 in accordance with one embodiment of the present invention.

It should be noted that this port allocation and reservation problem can be illustrated similar to the bus segment allocation table of FIG. 7 and thus its implementation logic can also be similar to FIG. 9 wherein each segment in this case reflects a register file segment instead of a bus segment. With the same analogy in this case, an instruction trying to access multiple register file segments can only succeed if it can reserve all its register segments requests, and will fail if any register segment access for that instruction is canceled, similar to the illustrations of the bus segments in FIG. 7.

Embodiments of the present invention implement a non-centralized access process for using the interconnects and the local interconnects. Requests, accesses and controls can be initiated for shared interconnects, resources or consumers by multiple non-centralized fetchers, senders, orchestrators, or agents. Those non centralized requests, accesses and controls contend at the shared resources using variations of methods and logic implementation as described in this invention depending on the topologies and structures of those shared resources. By way of example, the resources of the engines and their read/write ports need to be efficiently shared by the cores. Additionally, the finite number of global buses and local buses comprise resources that need to be efficiently shared. In the FIG. 3 embodiment, the non-centralized access process is implemented through reservation adders and threshold limiters. In one embodiment, at each contested resource, a reservation adder tree and a threshold limiter control access to that contested resources. As used herein, the term contested resource refers to read write ports of a load store buffer, memory/cache fragment, register file segment or L2 cache, a global buses reservation, or local buses reservation.

A reservation adder and a threshold limiter control access to each contested resource. As described above, to access a resource, a core needs to reserve the necessary bus and reserve the necessary port. During each cycle, orchestrators attempt to reserve the resources necessary to execute their pending instruction. For example, for an orchestrator scheduling an instruction I1 shown in FIG. 3, that orchestrator will set a flag, or a bit, in the reservation adder of its needed resource. In this case a bit is set in register file 1 and in register file 3. Other orchestrators will similarly set bits in the reservation adders of their needed resource. For example, a different orchestrator for instruction 12 sets two bits for register file 2. As the orchestrators request their needed resources the reservation adders sum the requests until they reach the threshold limiter. In the FIG. 4 embodiment, there are four ports for each of the resources. Hence, the reservation adders will accept flags from reservation requests until the four ports are all reserved. No other flags will be accepted.

An orchestrator will not receive confirmation to execute its instruction unless all of its flags necessary to execute the instruction are set. Hence, the orchestrator will receive confirmation to execute the instruction if the flags for the necessary buses are set and the flags for the necessary read write ports are set. If a cancel signal is received for any of the flags, all flags for that orchestrator's request are cleared, and the request is queued until the next cycle.

In this manner, each of the orchestrators contends with each other for the resources on a cycle by cycle basis. Requests that are canceled are queued and given priority in the next cycle. This ensures that one particular core is not locked out of resource access for large number of cycles. It should be noted that the resources in the proposed implementations get assigned automatically to the resources, for example if the request succeed in obtaining a resource (e.g., it is not canceled by the adder and threshold logic) then the adder sum output corresponding to that request represent the resource number assigned to that request, thus completing the resource assignment without requiring any further participation from the orchestrators. This reservation and allocation adder and threshold limiters fairly balance access to contested resources in a decentralized manner (e.g., there is no need for requestors/orchestrators to actively participate in any centralized arbitration). Each remote orchestrator sends its requests to the shared resources, those requests that succeed will be granted resources/buses automatically.

Figure 4:
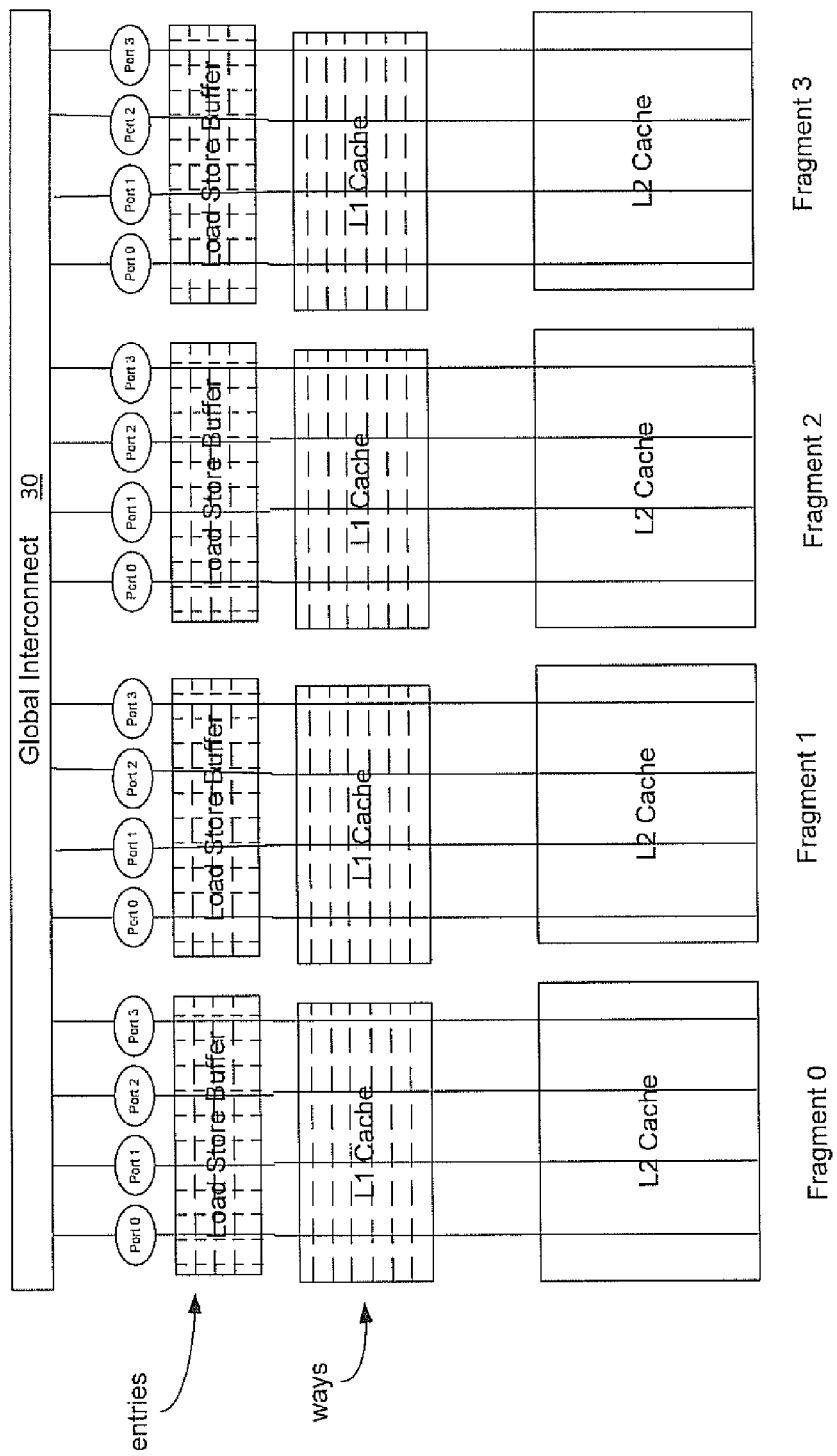
FIG. 4 shows the interconnect and the ports into the memory fragments in accordance with one embodiment of the present invention.

FIG. 4 shows the interconnect and the ports into the memory fragments in accordance with one embodiment of the present invention. As depicted in FIG. 4, each memory fragment is shown with four read write ports that provide read/write access to the load store buffer, the L1 cache, and the L2 cache. The load store buffer includes a plurality of entries and the L1 cache includes a plurality of ways.

As described above, embodiments of the present invention implement a non-centralized access process for using the interconnects and the local interconnects. The finite number of global buses and local buses comprise resources which must be efficiently shared by the cores. Thus, a reservation adder and a threshold limiter control access to each contested resource, in this case, the ports into each fragment. As described above, to access a resource, a core needs to reserve the necessary bus and reserve the necessary port.

Figure 5:
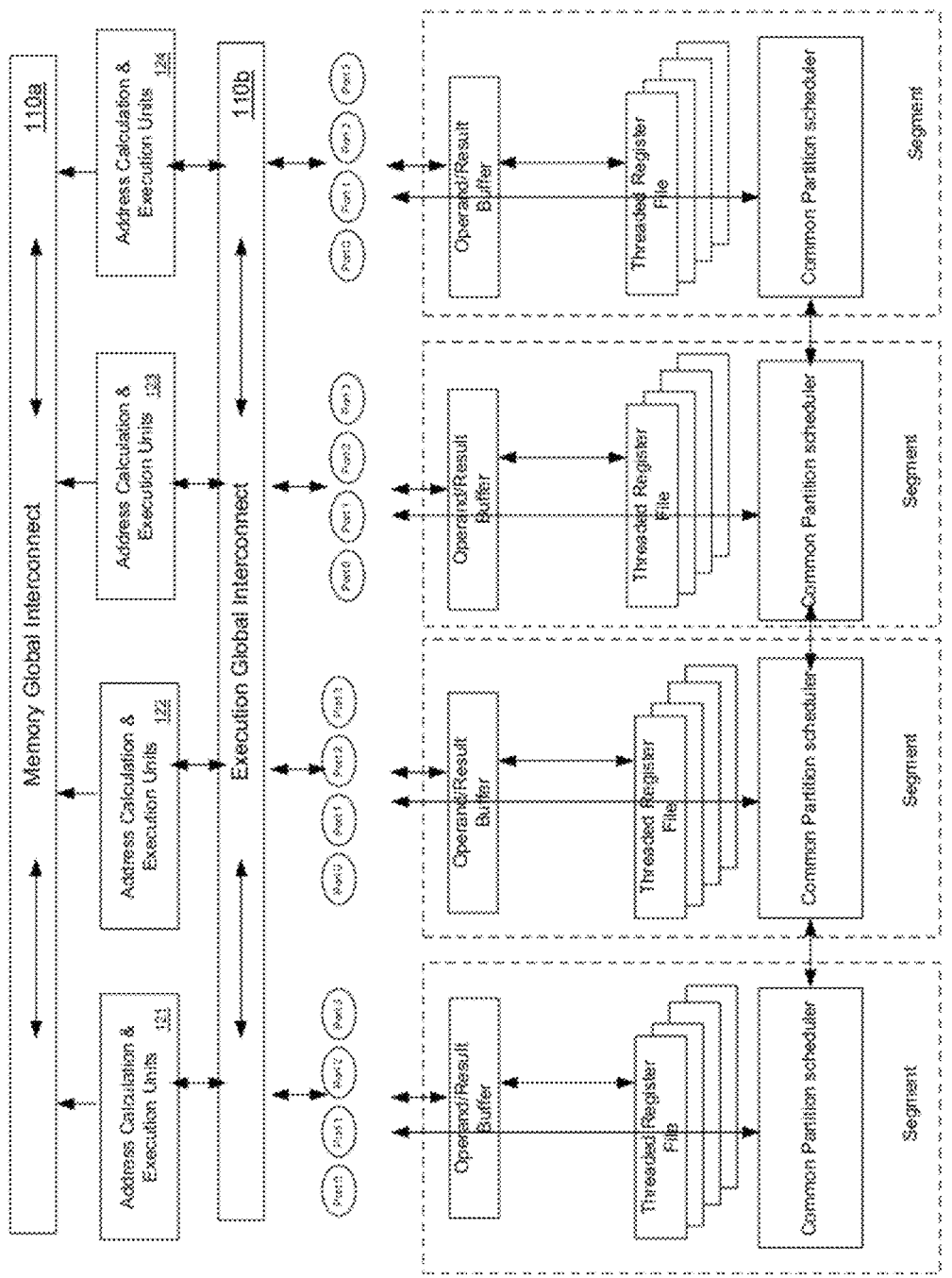
FIG. 5 shows the interconnect and the ports into the segments in accordance with one embodiment of the present invention.

FIG. 5 shows the interconnect and the ports into the segments in accordance with one embodiment of the present invention. As depicted in FIG. 5, each segment is shown with 4 read write ports that provide read/write access to the operand/result buffer, threaded register file, and common partition or scheduler. The FIG. 5 embodiment is shown as including a common partition or scheduler in each of the segments. In this embodiment, the common partition scheduler is configured to function in cooperation with the global front end fetch and scheduler shown in FIG. 1B.

The non-centralized access process for using the interconnects and the local interconnects employ the reservation adder and a threshold limiter control access to each contested resource, in this case, the ports into each segment. As described above, to access a resource, a core needs to reserve the necessary bus and reserve the necessary port.

Figure 6:
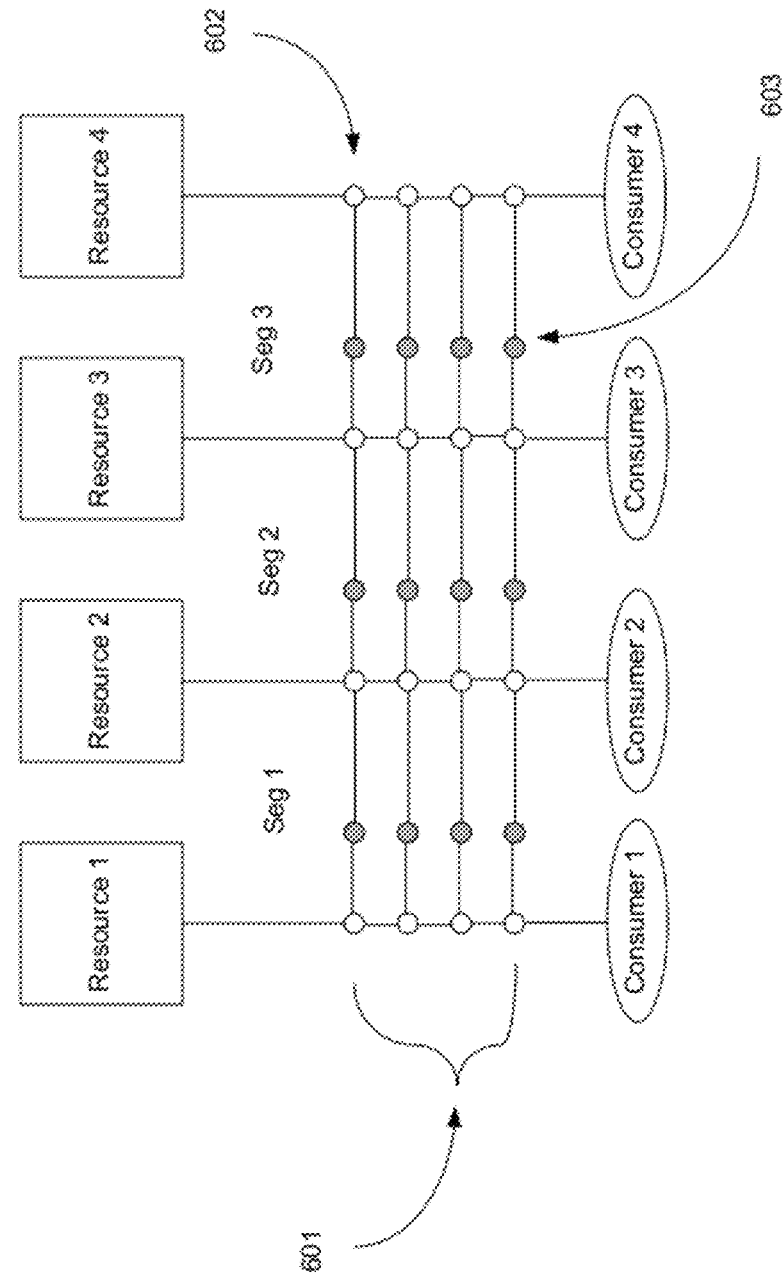
FIG. 6 shows a diagram depicting a segmented interconnect in accordance with one embodiment of the present invention.

FIG. 6 shows a diagram depicting a segmented interconnect 601 in accordance with one embodiment of the present invention. As shown in FIG. 6, an interconnect 601 is shown connecting resources 1-4 to consumers 1-4. The interconnect 601 is also shown as comprising segments 1, 2, and 3.

FIG. 6 shows an example of a fetch model interconnect structure. In the FIG. 6 embodiment, there are no orchestrators. In this embodiment, the resources are contended for by the consumers, as they attempt to fetch the necessary resources to support consumption (e.g., execution units). The consumers send the necessary fetch requests to the reservation adders and threshold limiters.

The interconnect structure comprises a plurality of global segmented buses. The local interconnect structure comprises a plurality of locally connected engine to engine buses. Accordingly, to balance costs in both performance and fabrication, there are a finite number of global buses and a finite number of local buses. In the FIG. 6 embodiment, four globally segmented buses are shown.

In one embodiment, the global buses can be segmented into 3 portions. The segmentation allows the overall length of the global buses to be adjusted in accordance with the distance of the global access. For example, an access by consumer 1 to resource 4 would span the entire bus, and thus not be segmented. However, an access by consumer 1 to resource 3 would not span the entire bus, and thus the global bus can be segmented between resource 3 and resource 4.

In the FIG. 6 embodiment, the interconnect 601 is shown as having 4 buses. The segmentation can be implemented via, for example, a tri-state buffer. The segmentation results in faster and more power efficient transmission characteristics of the bus. In the FIG. 6 embodiment, the buses each include one directional tri-state buffers (e.g., buffer 602) and bidirectional tri-state buffers (e.g., buffer 603). The bidirectional tri-state buffers are shaded in the FIG. 6 diagram. The buffers enable the interconnect to be segmented to improve its signal transmission characteristics. These segments also comprise resources which must be contested for an allocated for by the resource consumers. This process is illustrated in the FIG. 7 diagram below.

FIG. 7 shows a table that illustrates the manner which requests for segments of the interconnect 601 are contested for and allocated in accordance with one embodiment of the present invention. The left-hand side of the FIG. 7 table shows how requests are ordered as they are received within the cycle. In this case, eight requests are shown. When a request from a resource consumer wants to reserve a segment, that consumer places a one in the requested segment's reservation table. For example, for request 1, consumer 1 wants to reserve segment 1 and segment 2 in order to access resource 3. Thus, consumer 1 sets a flag, or a bit, in the request column for segment 1 and segment 2, while the column for segment 3 remains zero. In this manner, requests are added within the columns. Requests are allocated until they exceed the number of global buses, in this case four. When the requests exceed the number of global buses, they are canceled. This is shown by request number 6 and request number 7 having been canceled because they exceed the limit.

FIG. 8 shows a table that illustrates the manner in which requests for a point-to-point bus are handled in accordance with one embodiment of the present invention. As opposed to the table of FIG. 7, the table of FIG. 8 shows how only one consumer and only one resource can use a point-to-point bus (e.g., the interconnect illustrated in FIG. 2). The requests come from the multiple orchestrators that want to route resources through the point-to-point buses. In this case, the point-to-point bus shows the number of possible consumer resource pairs (e.g., the six columns proceeding from left to right) and a number of requests 1-8 proceeding from top to bottom. Because only one resource consumer pair can use a bus at any given time, the column can only have one request flag before all of the requests are canceled as exceeding the limit. Thus, in each column, the first request is granted while all subsequent requests are canceled as exceeding the limit. Since there are six global point-to-point buses, there are six columns which can accommodate six different requests in each cycle.

FIG. 9 shows a diagram of an exemplary logic implementation that implements the functionality of the table of FIG. 7 in accordance with one embodiment of the present invention. As described above, the table of FIG. 7 illustrates the manner which requests for segments of the interconnect 601 are contested for and allocated in accordance with one embodiment of the present invention. Specifically, FIG. 9 shows the logic for allocating the column associated with bus segment 2 from the table of FIG. 7.

The FIG. 9 embodiment shows a plurality of parallel adders 901-905. Both requests are canceled if the limit is exceeded. As described above, there are 4 buses which can be used to implement segment 2. The first four requests can be processed and granted because even if they are all flagged, by marking request with a logical one, they will not exceed the limit. The remaining requests need to be checked whether they will exceed the limit. This is done by the parallel adders 901-905. Each adder after the first three rows adds itself and all previous rows and checks against the limit. If the adder exceeds the limit, the request is canceled, as shown. The adder sum output also determines which particular bus segment is allocated to each request. In the FIG. 9 embodiment, this is by bus segment number as shown.

Figure 10:
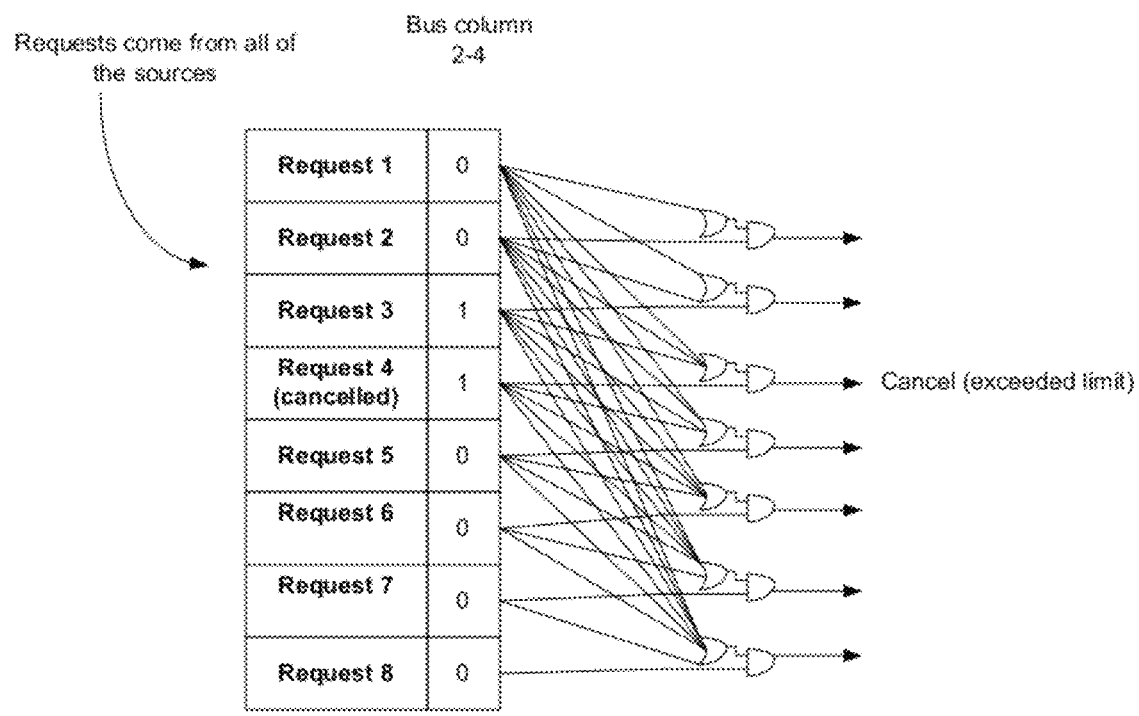
FIG. 10 shows a diagram of an exemplary logic implementation that implements the functionality of the manner in which requests for a point-to-point bus are handled in accordance with one embodiment of the present invention.

FIG. 10 shows a diagram of an exemplary logic implementation that implements the functionality of the manner in which requests for a point-to-point bus are handled in accordance with one embodiment of the present invention. The table of FIG. 8 shows how only one consumer and only one resource can use a point-to-point bus. Specifically, FIG. 10 shows the logic for allocating the column associated with bus column 2-4 from the table of FIG. 8.

The FIG. 10 embodiment shows a plurality of multi-input OR gates coupled to AND gates, as shown. As described above, one consumer and only one resource can use a point-to-point bus. Because only one resource/consumer pair can use a bus at any given time, the column can only have one request flag before all of the subsequent requests are canceled as exceeding the limit. Thus, in each column, the first request is granted while all subsequent requests are canceled as exceeding the limit. In the FIG. 10 embodiment, each row of the column is logically combined through an OR operation with all of the previous rows of the column and then is logically combined through an AND operation with itself. Thus, if any previous row reserves the column, all subsequent requests are canceled, as shown.

Figure 11:
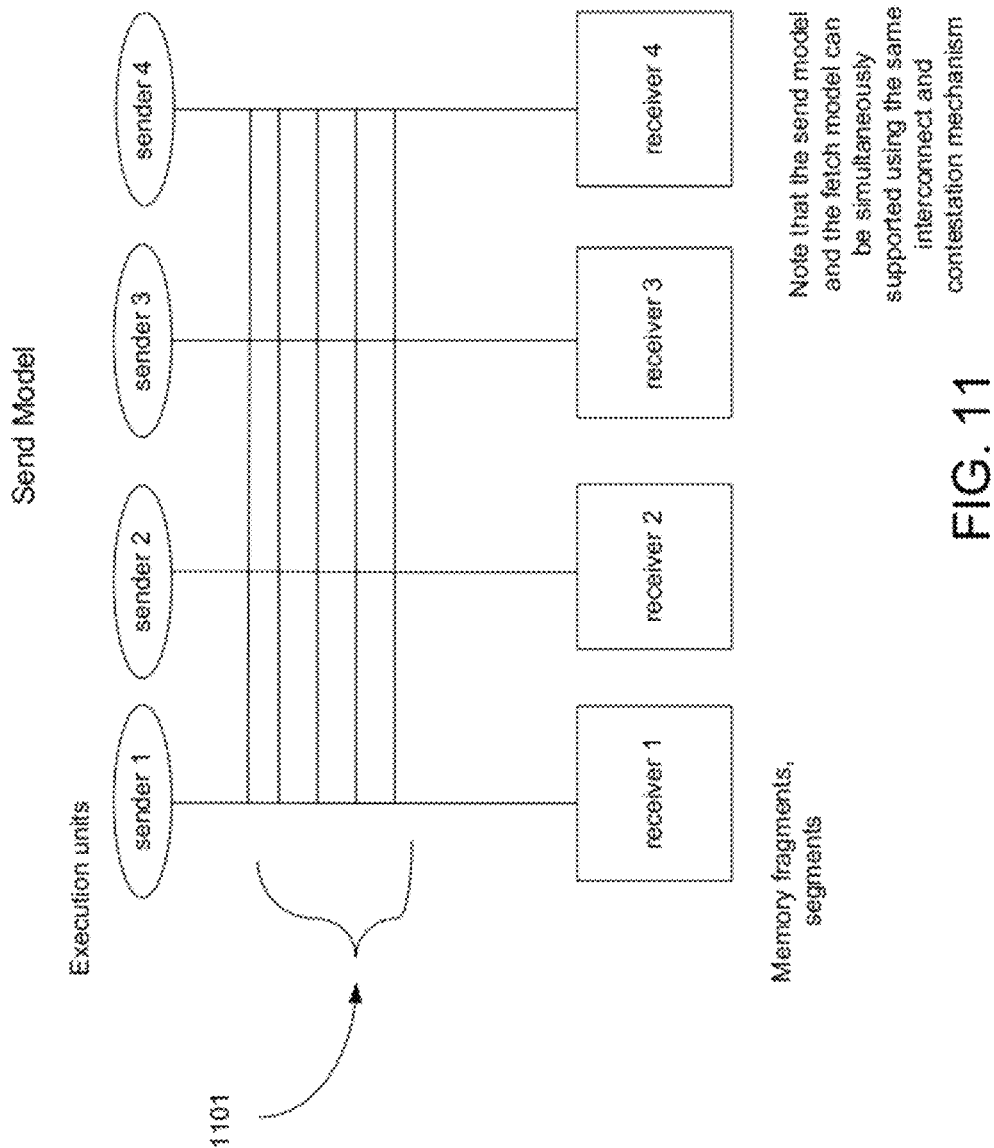
FIG. 11 shows a diagram of an interconnect in accordance with one embodiment of the present invention.

FIG. 11 shows a diagram of an interconnect 1101 in accordance with one embodiment of the present invention. The interconnect 1101 comprises five shared interconnect structures that are shared by each of the senders and each of the receivers.

The FIG. 11 embodiment shows an example of a send model interconnect structure. For example, the senders comprise the execution units of the engines. The receivers comprise the memory fragments and the register segments of the engines. In this model, the senders issue the necessary requests to the reservation adders and the threshold limiters to reserve resources to implement their transfers. These resources include ports into the receivers and a plurality of shared buses of the interconnect 1101.

Figure 12:
FIG. 12 shows a table illustrating the manner in which the sender model interconnect structure of FIG. 11 functions in accordance with one embodiment of the present invention.

FIG. 12 shows a table illustrating the manner in which the sender model interconnect structure of FIG. 11 functions in accordance with one embodiment of the present invention. The table shows the requests as they are received from all of the senders. The right hand side of the table shows the interconnect allocation. Since the interconnect 1101 comprises five shared buses, the first five requests are granted, and any further requests are canceled as exceeding the limit. Thus, request 1, request 3, request 4, request 5, and request 6 are granted. However, request 7 is canceled as having exceeded the limit.

Figure 13:
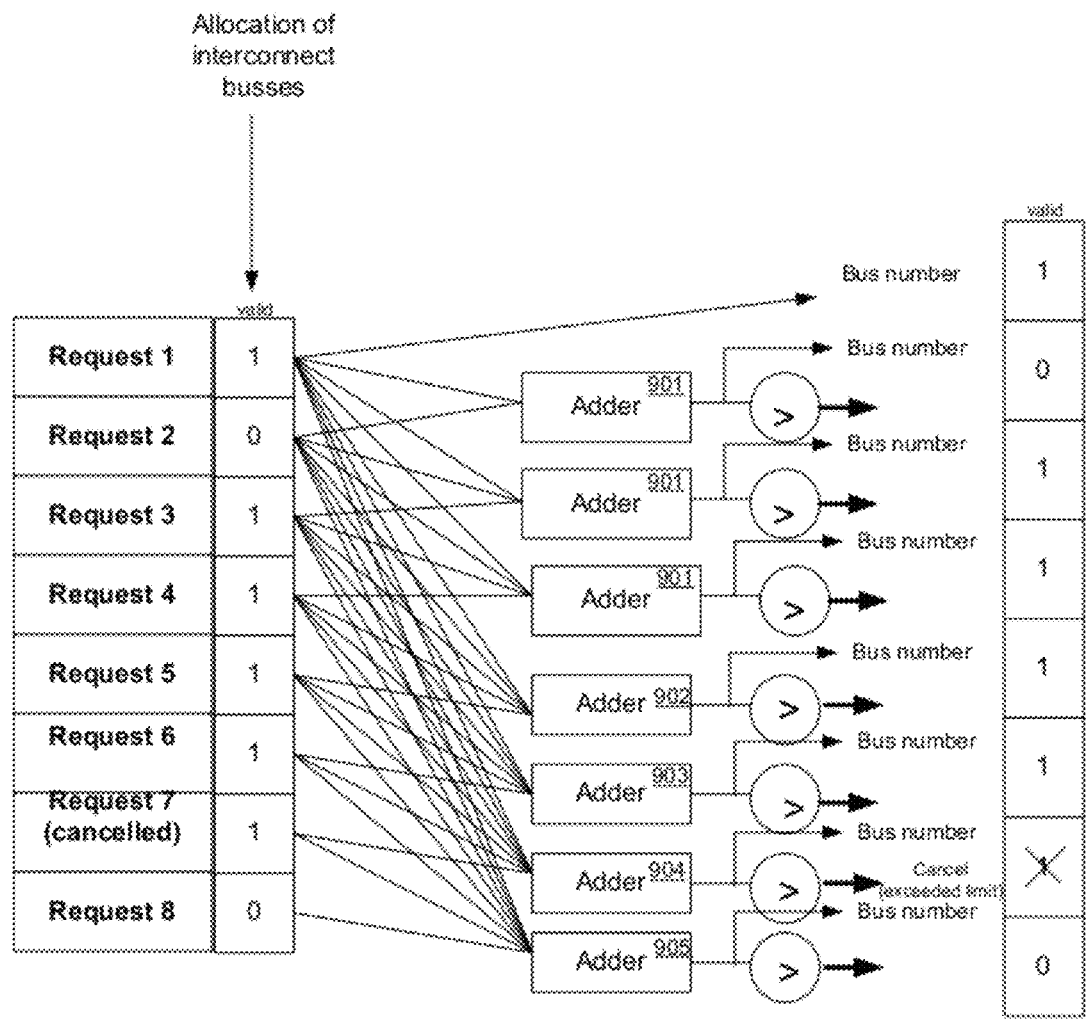
FIG. 13 shows a diagram of an exemplary logic implementation that implements the functionality of the manner in which requests for shared bus interconnect structure are handled in accordance with one embodiment of the present invention.

FIG. 13 shows a diagram of an exemplary logic implementation that implements the functionality of the manner in which requests for shared bus interconnect structure are handled in accordance with one embodiment of the present invention.

FIG. 13 shows how the allocation of the interconnect buses is handled by the adders 901-905. This logic implements the table of FIG. 12. As requests are received, corresponding flags are set. The adders add their respective flag with all prior flags. Flags will be granted along with their bus number by the adder so long as they do not exceed the limit, which is five in this case. As described above, any requests that exceed the limit are canceled.

It should be noted that the sender model and the fetch model of an interconnect can be simultaneously supported using a common interconnect structure and a common contesting mechanism. This is shown by the similarity of the diagram of FIG. 13 to the diagram of FIG. 9.

It should be noted that current presentations in the current invention of different models of communications (Sender, Fetch, Orchestrator, etc.) and different interconnect topologies (point to point busses, multi-bus, and segmented busses, etc.) should not be interpreted as the only communication modes or the only interconnect topologies applicable to the current invention. To the contrary, one skilled in the art can easily mix and match the different contestation, reservation and allocation techniques of the current invention with any communication mode or bus topology.

It should be further noted that the described embodiments of the current invention present interconnects alongside the resources. This should be understood as a generalized illustration meant to show a broader set of possibilities for implementing the current invention, but it should be noted that the meaning of interconnects as used in the current invention is not limited to data interconnects between different cores or compute engines or between register files or memory fragments, but refers also to the control interconnects that carry the requests to the resources and the physical interconnects that carry data from structures (i.e., register file ports, memory ports, array decoder busses, etc.). This broader meaning is illustrated in FIG. 3, for example, which shows the interconnects only as the ports coming out of each register file.

Figure 14:
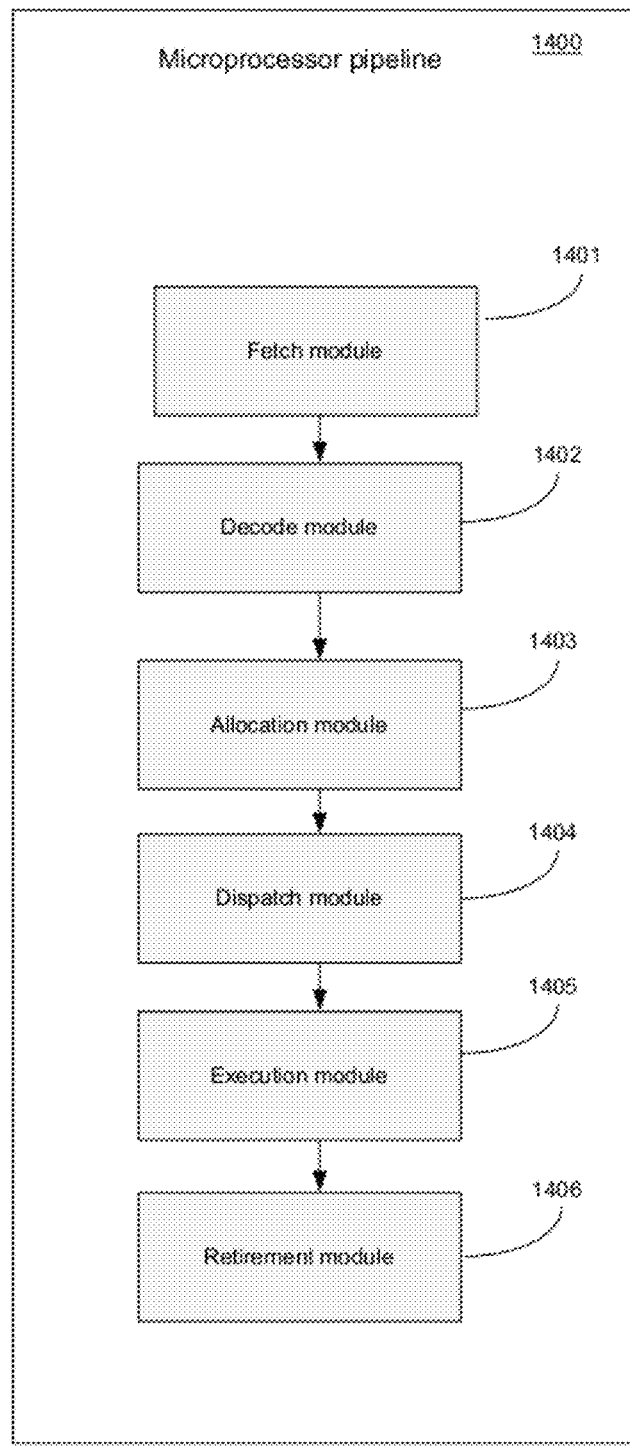
FIG. 14 shows a diagram of an exemplary microprocessor pipeline in accordance with one embodiment of the present invention.

FIG. 14 shows a diagram of an exemplary microprocessor pipeline 1400 in accordance with one embodiment of the present invention. The microprocessor pipeline 1400 includes a fetch module 1401 that implements the functionality of the process for identifying and extracting the instructions comprising an execution, as described above. In the FIG. 14 embodiment, the fetch module is followed by a decode module 1402, an allocation module 1403, a dispatch module 1404, an execution module 1405 and a retirement module 1406. It should be noted that the microprocessor pipeline 1400 is just one example of the pipeline that implements the functionality of embodiments of the present invention described above. One skilled in the art would recognize that other microprocessor pipelines can be implemented that include the functionality of the decode module described above.

For purposes of explanation, the foregoing description refers to specific embodiments that are not intended to be exhaustive or to limit the current invention. Many modifications and variations are possible consistent with the above teachings. Embodiments were chosen and described in order to best explain the principles of the invention and its practical applications, so as to enable others skilled in the art to best utilize the invention and its various embodiments with various modifications as may be suited to their particular uses.

What is claimed is:

1. A multicore processor having an interconnect system, the system comprising:
    a plurality of resources having data for supporting the execution of multiple code sequences;
    a plurality of partitionable engines for implementing the execution of the multiple code sequences;
    a plurality of resource consumers within each of the plurality of partitionable engines;
    a global interconnect structure for coupling the plurality of resource consumers with the plurality of resources to access the data and execute the multiple code sequences, wherein the resource consumers access the resources through a cycle by cycle utilization of the global interconnect structure, wherein the global interconnect structure comprises a routing matrix of transmission lines that allows the plurality of resource consumers to access data from any storage location within the plurality of resources, wherein the system further includes a plurality of local interconnect structures that enable adjacent partitionable engines to directly access data from adjacent resources; and
    a plurality of schedulers operable to schedule a resource for transfer through the global interconnect structure to a resource consumer.

2. The multicore processor of claim 1, wherein the resource consumers can be selected from a group consisting of: execution units and address calculation units of the partitionable engines.

3. The multicore processor of claim 1, wherein the resources comprise memory fragments.

4. The multicore processor of claim 1, wherein the resources comprise register file segments.

5. The multicore processor of claim 1, wherein the global interconnect structure comprises a plurality of point-to-point buses, wherein the resource consumers access the resources through the cycle by cycle utilization.

6. The multicore processor of claim 1, wherein the global interconnect structure comprises a memory interconnect structure and an execution interconnect structure.

7. The multicore processor of claim 1, wherein scheduling a resource for transfer comprises:
    identifying the resource from the plurality of resources;
    reserving a bus in the global interconnect structure; and
    transferring the resource to a resource consumer that is ready for execution.

8. A microprocessor, comprising
    a plurality of resources having data for supporting the execution of multiple code sequences;
    a plurality of partitionable engines for implementing the execution of the multiple code sequences;
    a plurality of resource consumers within each of the plurality of partitionable engines;
    a global interconnect structure for coupling the plurality of resource consumers with the plurality of resources to access the data and execute the multiple code sequences, wherein the resource consumers access the resources through a cycle by cycle utilization of the global interconnect structure, wherein the global interconnect structure comprises a routing matrix of transmission lines that allows the plurality of resource consumers to access data from any storage location within the plurality of resources;
    a plurality of local interconnect structures that enable adjacent partitionable engines to directly access data from adjacent resources; and
    a plurality of schedulers operable to schedule a resource for transfer through the global interconnect structure to a resource consumer.

9. The microprocessor of claim 8, wherein the resource consumers can be selected from a group consisting of: execution units and address calculation units of the partitionable engines.

10. The microprocessor of claim 8, wherein the resources comprise memory fragments.

11. The microprocessor of claim 8, wherein the resources comprise register file segments.

12. The microprocessor of claim 8, wherein the global interconnect structure comprises a plurality of point-to-point buses, wherein the resource consumers access the resources through the cycle by cycle utilization.

13. The microprocessor of claim 8, wherein the global interconnect structure comprises a memory interconnect structure and an execution interconnect structure.

14. A computer system having a microprocessor coupled to a computer readable memory, wherein the microprocessor comprises:
    a plurality of resources having data for supporting the execution of multiple code sequences;
    a plurality of partitionable engines for implementing the execution of the multiple code sequences;
    a plurality of resource consumers within each of the plurality of partitionable engines;
    a global interconnect structure for coupling the plurality of resource consumers with the plurality of resources to access the data and execute the multiple code sequences. wherein the resource consumers access the resources through a cycle by cycle utilization of the global interconnect structure, and wherein the resource consumers comprise execution units of the engines, wherein the global interconnect structure comprises a routing matrix of transmission lines that allows the plurality of resource consumers to access data from any storage location within the plurality of resources;
    a plurality of local interconnect structures that enable adjacent partitionable engines to directly access data from adjacent resources; and
    a plurality of schedulers operable to direct routing of a resource through the global interconnect structure to a resource consumer.

15. The computer system of claim 14, wherein the resources comprise memory fragments.

16. The computer system of claim 14, wherein the resources comprise register file segments.

17. The computer system of claim 14, wherein the global interconnect structure comprises a plurality of point-to-point buses, wherein the resource consumers access the resources through the cycle by cycle utilization.

18. The computer system of claim 14, wherein the global interconnect structure comprises a memory interconnect structure and an execution interconnect structure.

19. The computer system of claim 14, wherein the global interconnect structure comprises an orchestrate model interconnect structure.

20. The computer system of claim 14, further comprising:
   an adder structure that sums requests for access to the plurality of resources and that particularly assigns a unique port for each successful request in accordance with adder structure output sums.

21. The computer system of claim 14, further comprising:
   an adder structure that sums requests for access to the plurality of resources and that particularly assigns a unique bus and a unique port for each successful request in accordance with adder structure output sums to arbitrate and allocate a plurality of resources on a cycle by cycle basis.

22. The computer system of claim 14, further comprising:
   an adder structure that functions in accordance with a fetch model, or a send model, or an orchestrate model, and that sums requests for access to the plurality of resources and that particularly assigns a unique bus and a unique port for each successful request in accordance with adder structure output sums to arbitrate and allocate a plurality of resource on a cycle by cycle basis, and in accordance with said fetch model, said send model, or said orchestrate model.

* * * * *